UNITED STATES PATENT OFFICE.

WILLIAM L. POTTER, OF CLIFTON PARK, NEW YORK.

IMPROVEMENT IN ROOFING MATERIALS.

Specification forming part of Letters Patent No. 59,065, dated October 23, 1866.

*To all whom it may concern:*

B it known that I, WILLIAM L. POTTER, of Clifton Park, in the county of Saratoga and State of New York, have invented a new and useful Improvement in Plastic Roofing; and I do hereby declare that the following is a full, clear, and exact description thereof, which will enable others skilled in the art to make and use the same, reference being had to the accompanying drawing, forming a part of this specification, in which the figure is a cross-section of a piece of my improved roofing.

My invention has for its object to furnish an improved cheap temporary roofing for light structures, such as tents, shanties, car-tops, decks, and roofs generally; and it consists of the combination of two pieces or layers of felt, or other suitable fabric, with my plastic roofing patented February 21, 1865, and July 17, 1866, as hereinafter more fully described.

In preparing my improved roofing, I take a piece, A, of ordinary roofing-felt, made and prepared in the usual manner, or any other suitable fabric. This piece of felt or other fabric I then cover with a layer, B, of my plastic roofing, said layer being made thicker or thinner, according to the character of the structure for covering which the roofing is to be used. This layer B, I then cover with another piece or layer, C, of felt or other fabric, as shown in the drawing. When thus prepared I pass the whole through between a pair of rollers, which presses it closely together, causing the felt to adhere closely to the plastic material; or it may be subjected to a suitable pressure in any other convenient manner. This roofing may be applied to roofs by cementing the edges of the adjacent pieces to each other and securing it to the roof in the ordinary manner.

A great objection to felt roofing as ordinarily constructed is that when it becomes damp or wet upon either its upper or lower sides the moisture causes the felt to swell or expand, which expansion causes the felt thus wet to bulge or wrinkle in various directions, and when dry it again contracts to its original dimensions. This expansion and contraction soon cracks and destroys the interposed waterproof layer or layers, rendering the roofing useless for the purpose to which it was applied; but in my improved roofing the interposed layer of my plastic roofing adheres so firmly to the felt or other fabric that it cannot wrinkle or bulge, and the only effect of moisture or wet upon the felt is to full it up or thicken it, and when dry it again shrinks to its ordinary thickness, leaving the interposed layer uninjured, and being at all times smooth and unwrinkled.

I claim as new and desire to secure by Letters Patent—

An improved roofing formed by the combination of two pieces or layers, A and C, of felt or other suitable fabric, with an interposed layer, B, of my plastic roofing patented February 21, 1865, and July 17, 1866, when said roofing is constructed and prepared substantially as herein shown and described, and for the purpose set forth.

The above specification of my invention signed by me this 13th day of August, 1866.

WM. L. POTTER.

Witnesses:
ALEX. F. ROBERTS,
JAMES T. GRAHAM.